United States Patent
Van Der Ende (10) Patent No.: US 10,422,213 B2
(45) Date of Patent: Sep. 24, 2019

(54) MEASUREMENT METHOD AND SYSTEM

(71) Applicant: Paradigm Technology Services B.V., Groot-Ammers (NL)

(72) Inventor: Andre Van Der Ende, Udny Green (GB)

(73) Assignee: PARADIGM TECHNOLOGY SERVICES B.V., Groot-Ammers (NL)

( * ) Notice: Subject to any disclaimer, the term of this patent is extended or adjusted under 35 U.S.C. 154(b) by 0 days.

(21) Appl. No.: 15/515,715

(22) PCT Filed: Sep. 30, 2015

(86) PCT No.: PCT/EP2015/072580
§ 371 (c)(1),
(2) Date: Mar. 30, 2017

(87) PCT Pub. No.: WO2016/050855
PCT Pub. Date: Apr. 7, 2016

(65) Prior Publication Data
US 2017/0306749 A1    Oct. 26, 2017

(30) Foreign Application Priority Data

Sep. 30, 2014 (GB) .................................. 1417272.0

(51) Int. Cl.
*E21B 47/04* (2012.01)
*G01B 7/02* (2006.01)
*G01B 7/26* (2006.01)

(52) U.S. Cl.
CPC .............. *E21B 47/04* (2013.01); *G01B 7/026* (2013.01); *G01B 7/26* (2013.01)

(58) Field of Classification Search
CPC ............ E21B 47/04; G01B 7/026; G01B 7/26
See application file for complete search history.

(56) References Cited

U.S. PATENT DOCUMENTS

| 3,490,149 A | * | 1/1970 | Bowers ................... E21B 47/04 340/854.1 |
| 4,454,756 A | | 6/1984 | Sharp et al. |

(Continued)

FOREIGN PATENT DOCUMENTS

| EP | 1845230 A1 | 10/2007 |
| GB | 2376302 A | 12/2002 |
| GB | 2518661 A | 4/2015 |

OTHER PUBLICATIONS

International Search Report; dated Feb. 15, 2016; Five (5) Pages.
GB Search Report; Appl. No. GB1417272.0; Jul. 21, 2015; 2 pages.

*Primary Examiner* — Ryan W Sherwin
(74) *Attorney, Agent, or Firm* — William H. Honaker; Dickinson Wright PLLC (57) ABSTRACT

A method for use in measuring a property of an environment or an object in, or adjacent to, an elongated space (10), comprises unspooling and/or spooling a line (6) attached to a tool (4) so as to move the tool along an elongated space. The method may comprise using the tool to measure a property of an environment or an object in, or adjacent to, an elongated space during movement of the tool along the elongated space. The method may comprise, determining an acceleration of the line, measuring an acceleration of the tool along the elongated space, and controlling damping of the movement of the tool along the elongated space according to the measured acceleration of the tool and the determined acceleration of the line. The elongated space may be located downhole or may be defined in, or adjacent to, an oil or gas well.

26 Claims, 4 Drawing Sheets

(56) References Cited

U.S. PATENT DOCUMENTS

| | | | |
|---|---|---|---|
| 4,797,822 A * | 1/1989 | Peters | E21B 47/022 |
| | | | 33/304 |
| 5,019,978 A | 5/1991 | Howard, Jr. et al. | |
| 6,216,789 B1 | 4/2001 | Lorsignol et al. | |
| 2012/0145394 A1 | 6/2012 | Jensen et al. | |
| 2013/0068479 A1 * | 3/2013 | AlDossary | E21B 23/14 |
| | | | 166/381 |
| 2016/0215614 A1 * | 7/2016 | Song | G01V 1/48 |

* cited by examiner

MEASUREMENT METHOD AND SYSTEM

CROSS REFERENCE TO RELATED APPLICATION

This application claims the benefit of PCT International Application Serial No. PCT/EP2015/072580 filed on Sep. 30, 2015, which claims priority to GB 1417272.0 filed on Sep. 30, 2014, and entitled "Measurement method and system," the contents of which are incorporated herein by reference in their entirety.

FIELD

A method and system are disclosed herein for use in measuring a property of an environment or an object in, or adjacent to, an elongated space such as an elongated space located downhole or an elongated space defined in, or adjacent to, an oil or gas well.

BACKGROUND

In the oil and gas industry, it is well known to make measurements along a wellbore using a tool which is raised or lowered in the wellbore suspended from a line or cable such as a wireline or a slickline. Such measurements are often referred to as well logging and may relate to a property of an environment in or adjacent to the wellbore or to a property of an object located in or adjacent to the wellbore. For the purposes of analysis of data measured using a well logging tool, it is important to accurately associate the true depth of the tool with the corresponding data measured by the tool at the true depth.

In a typical logging system, the length of line unspooled at the surface is measured and the depth of the logging tool in the well is assumed to be equal to the measured length of line unspooled. The length of line unspooled is usually determined by placing a measurement sheave wheel of known diameter in contact with the line and counting the number of revolutions of the measurement sheave wheel. However, the accuracy of the measured unspooled line lengths thus obtained may depend on line elasticity and line tension. Line tension may vary according to static and/or dynamic forces which act on the tool as the tool is lowered or raised in the wellbore. The main static forces are line weight and tool weight. The dynamic forces may include friction or fluid drag forces on the line and the downhole tool. Accordingly, it is known to correct the determined tool depth for line tension. The line tension is usually measured at surface by deflecting the line over one or more sheaves or pulleys and measuring the resultant force on a shaft of a sheave or pulley.

It is also known to employ other methods and tools for correction of the measured tool depth. One method defines the tool position by correlation to well or casing geometry by using a magnetic casing collar locator (CCL) or a gamma ray type sensor. Other methods make use of magnetic marks placed on the line used to lower or raise the downhole tool in the wellbore.

Typically, logging measurements are made using downhole sensors at regular intervals as the tool is raised by the line at a fixed speed. For logging operations performed using an electrically conductive line such as a wireline, the sensor data may be transmitted to the surface through one or more electrical conductors of the line. However, wireline logging operations are generally more costly than slickline logging operations because wireline logging operations generally require a more complex sealing arrangement between the wellhead and the wireline for containing well pressure. Accordingly, it is known to perform logging operations using a slickline which allows a seal to be more easily created at the wellhead. For logging operations performed using slickline, the sensor data is usually recorded to a memory of the tool. It is also known to perform logging operations using an insulated slickline which may permit limited data to be transmitted in real-time through the slickline to surface but which may still require at least some of the logged data to be recorded to a memory of the tool. After recovery of the tool to surface, the recorded sensor data is later associated with depth data determined from line measurements made at the surface over the same measurement time period. The association of the sensor data and the depth data is accurate provided the tool moves at the same speed as the line at the surface. However, due to the combination of line elasticity and irregular tool motion caused by friction between the tool and the well bore wall (and possibly also between the line and the well bore wall), the instantaneous speed of the tool may differ substantially from the speed of the line at the surface. Accordingly, it is known to correct tool depths determined from unspooled line length measurements made at surface according to measured tool acceleration. Tool acceleration may, for example, be measured using an accelerometer within the tool that has a measurement axis aligned with a direction of travel of the tool along the wellbore. Tool acceleration measurements may also be combined with line tension measurements to correct tool depths determined from unspooled line length measurements made at surface. However, such known methods of tool depth correction may still lead to inaccurate tool depth estimates. Where interpolation is used to estimate a measured property value at a particular tool depth, this may also lead to inaccurate estimates of the measured property at a particular tool depth.

SUMMARY

Aspects of a method, a system and a tool are disclosed herein. It should be understood that any one or more features of any aspect may apply alone or in any combination in relation to any other aspect.

According to an aspect there is provided a method for use in measuring a property of an environment or an object in, or adjacent to, an elongated space.

The elongated space may be defined downhole and/or the elongated space may be defined in, or adjacent to, an oil or gas well.

The method may comprise unspooling and/or spooling a line attached to a tool so as to move the tool along the elongated space.

The method may comprise using the tool to measure a property of an environment or an object in, or adjacent to, an elongated space during movement of the tool along the elongated space.

The method may comprise determining an acceleration of the line.

The method may comprise measuring an acceleration of the tool along the elongated space.

The method may comprise controlling damping of the movement of the tool along the elongated space according to the measured acceleration of the tool and the determined acceleration of the line.

The method may comprise unspooling a line attached to the tool from a winch drum so as to move the tool along the elongated space.

The method may comprise spooling a line attached to the tool onto the winch drum so as to move the tool along the elongated space.

The line may comprise at least one of a slickline, an insulated slickline, a composite slickline, a wireline, an electric line, a reelable support member, a cable and the like.

The line may comprise one or more reinforcing elements embedded within a matrix material.

Each one or more reinforcing element may comprise a reinforcing fibre.

The matrix material may comprise a polymer material.

The line may comprise a fibre-polymer composite slickline.

Such a method may serve to at least partially suppress any irregular tool motion along the elongated space such as any sudden changes in tool speed or any tool oscillations that may, for example, occur after a stuck or slow moving tool breaks free from a wellbore wall. This may provide more uniform measurement densities (samples per unit distance) for a fixed sampling rate which may, in turn, improve the accuracy of tool depth measurements. Where interpolation is used, this may also improve the accuracy of estimates of the measured property at a particular tool depth.

The tool may comprise a downhole tool.

The tool may comprise a logging tool.

The method may comprise varying a degree of the damping according to the measured acceleration of the tool and the determined acceleration of the line.

The method may comprise may comprise measuring an angular acceleration of a sheave wheel around which the line passes as the line is unspooled and/or spooled.

The method may comprise determining the acceleration of the line from the measured angular acceleration of the sheave wheel and a known diameter of the sheave wheel.

The method may comprise measuring an acceleration of the tool along the elongated space using an accelerometer provided with the tool. A measurement axis of the accelerometer may be aligned with a direction of tool motion along the elongated space. The accelerometer may comprise a z-axis accelerometer.

The method may comprise determining a difference between the measured acceleration of the tool and the determined acceleration of the line.

The method may comprise varying the damping of the movement of the tool along the elongated space according to the difference between the measured acceleration of the tool and the determined acceleration of the line.

The method may comprise varying the damping so as to reduce the difference between the measured acceleration of the tool and the determined acceleration of the line. Such a method may serve to at least partially suppress any irregular tool motion along the elongated space.

The method may comprise varying the damping so as to reduce a magnitude of the difference between the measured acceleration of the tool and the determined acceleration of the line to a value less than a predetermined threshold value.

The method may comprise varying the damping so that a magnitude of the difference between the measured acceleration of the tool and the determined acceleration of the line is substantially equal to zero.

The method may comprise varying the damping so as to critically damp any oscillatory motion of the tool along the elongated space.

The method may comprise varying the damping before a known future change in line speed. The method may comprise varying the damping according to the known future change in line speed. This may serve to at least partially reduce the time taken to reduce or suppress any oscillatory motion of the tool resulting from the known future change in line speed. This may help to reduce the time taken to achieve a constant tool speed and thereby improve logging accuracy.

The known future change in line speed may be a planned change in line speed which may, for example, be caused by a planned change in winch speed. The planned change in line speed may comprise a change from zero line speed when the tool is stationary before a logging run to a desired or target line speed to be used for a logging run.

The known future change in line speed may be a predictable change in line speed which may, for example, be caused by a change in the spooled configuration of the line on a winch drum during rotation of the winch drum at a constant speed.

The known future change in line speed may be caused during unspooling of the line from a winch drum rotating at a constant speed when the line is unspooled from a first layer of line on the winch drum and is subsequently unspooled from a second layer of line on the winch drum which underlies the first layer of line. Unspooling of the line from a different layer of line on the winch drum in this way may result in a change in the effective diameter of the winch drum which results in a predictable change in line speed during rotation of the winch drum at a constant speed.

Conversely, the known future change in line speed may be caused during spooling of the line onto a winch drum rotating at a constant speed when the line is spooled so as to form a first layer of line on the winch drum and is subsequently spooled so as to form a second layer of line on the winch drum which overlies the first layer of line on the winch drum. Spooling of the line so as to form a different layer of line on the winch drum in this way may result in a change in the effective diameter of the winch drum which results in a predictable change in line speed during rotation of the winch drum at a constant speed.

The method may comprise determining a value for a position of the tool along the elongated space from the determined acceleration of the tool.

The method may comprise determining a value for a position of the tool along the elongated space from the acceleration of the tool determined at one or more instants in time. The method may comprise determining, for example, measuring and/or sampling the acceleration of the tool at one or more instants in time after commencement of a logging run, for example after commencement of rotation of the winch drum. The method may comprise using a system controller provided separately from the tool to determine the line acceleration. The system controller may be located at or adjacent to one end of the elongated space or remotely from the elongated space.

The method may comprise communicating the measured tool acceleration from a tool controller provided with the tool to the system controller via the line. The method may comprise communicating the measured tool acceleration as an electrical signal from the tool controller to the system controller via the line.

The method may comprise using the system controller to determine a required degree of the damping according to the measured acceleration of the tool and the determined acceleration of the line. The method may comprise using the system controller to determine a required damping factor according to the measured acceleration of the tool and the determined acceleration of the line.

The method may comprise communicating the required degree of the damping from the system controller to the tool controller via the line.

The method may comprise using the tool controller to control a damper provided with the tool so as to vary the degree of the damping provided by the damper according to the required degree of the damping.

The method may comprise communicating the determined line acceleration from the system controller to the tool controller via the line. The method may comprise communicating the determined line acceleration as an electrical signal from the system controller to the tool controller via the line.

The method may comprise using the tool controller to determine the required degree of the damping according to the measured acceleration of the tool and the determined acceleration of the line.

The method may comprise using the tool controller to control the degree of the damping according to the required degree of the damping.

The method may comprise using the tool controller to determine a required damping factor according to the measured acceleration of the tool and the determined acceleration of the line.

The method may comprise varying the degree of the damping according to the required degree of the damping.

The method may comprise determining a length of the line unspooled and/or spooled.

The method may comprise counting the number of revolutions of a sheave wheel around which the line passes as the line is unspooled and/or spooled.

The method may comprise determining the length of the line unspooled and/or spooled from the counted number of revolutions of the sheave wheel and a known diameter of the sheave wheel.

The method may comprise determining a value for a position of the tool along the elongated space according to the determined length of line unspooled and/or spooled.

The method may comprise storing the determined tool position value.

The method may comprise measuring a tension in the line.

The method may comprise correcting the determined tool position value according to the measured line tension.

The method may comprise associating the measured value of the property of the environment or the object with the determined tool position value.

The method may comprise controlling damping of the rolling of a rolling body of the tool along a surface which defines the elongated space.

The rolling body may comprise a wheel.

The rolling body may define a generally cylindrical or a generally spherical outer surface for engaging the surface which defines the elongated space.

The method may comprise controlling damping of the rotation of the wheel so as to damp movement of the tool along the elongated space.

The rolling body may comprise an elongate member, a track, a chain, a tape or a belt.

The rolling body may be in engagement with a sprocket.

The method may comprise controlling damping of the rotation of the sprocket so as to damp movement of the tool along the elongated space.

The method may comprise allowing the rolling body to roll freely during deployment of the tool along the elongated space and then damping rolling of the rolling body whilst the tool is used to measure the property of the environment or the object during movement of the tool along the elongated space. Allowing the rolling body to roll freely in this way during deployment of the tool along the elongated space may ease and/or speed up deployment of the tool along the elongated space. Damping rolling of the rolling body may then be applied during a logging run.

The method may comprise controlling one or more viscous drag properties of the tool during movement of the tool through fluid present within the elongated space so as to control damping of the movement of the tool along the elongated space.

The method may comprise controlling the configuration of one or more flow control members of the tool so as to control the one or more viscous drag properties of the tool during movement of the tool through fluid present within the elongated space.

The method may comprise controlling a flow of fluid present within the elongated space through the tool so as to control the one or more viscous drag properties of the tool during movement of the tool through fluid present within the elongated space.

The measured value of the property of the environment or the object may comprise at least one of a pressure, a temperature, a fluid flow rate, a fluid composition, a property of the tool, a position of the tool, a speed of the tool, an acceleration of the tool, energy stored in the tool, power generated by the tool and power consumed by the tool.

The method may comprise storing the measured value of the property of the environment or the object in a memory of the tool.

The method may comprise recovering the tool from the elongated space, accessing the stored value of the property of the environment or the object from the memory of the tool and associating the stored value of the property of the environment or the object with the stored position value of the tool along the elongated space.

The method may comprise communicating a measured value of the property of the environment or the object to the system controller via the line.

According to an aspect there is provided a system for measuring a property of an environment or an object in, or adjacent to, an elongated space.

The elongated space may be defined downhole and/or the elongated space may be defined in, or adjacent to, an oil or gas well.

The system may comprise a tool.

The tool may comprise a sensor for measuring a property of an environment or an object in or adjacent to an elongated space.

The tool may comprise a damper for damping movement of the tool along the elongated space.

The system may comprise a line attached to the tool.

The line may comprise at least one of a slickline, an insulated slickline, a wireline, an electric line, a reelable support member, a cable and the like.

The system may comprise a winch located at, or adjacent to, one end of the elongated space for spooling and/or unspooling the line for movement of the tool along the elongated space.

The system may comprise an apparatus for determining an acceleration of the line.

The system may comprise an apparatus for measuring an acceleration of the tool along the elongated space.

The system may comprise a controller configured to control the damper so as to control damping of the movement of the tool along the elongated space according to the determined acceleration of the line and the measured acceleration of the tool.

Such a system may serve to suppress any irregular tool motion along the elongated space such as any sudden changes in tool speed or any tool oscillations that may, for example, occur after a stuck or slow moving tool breaks free from a wellbore wall. This may provide more uniform measurement densities (samples per unit distance) which may, in turn, improve the accuracy of tool depth estimates. Where interpolation is used, this may also improve the accuracy of estimates of the measured property at a particular tool depth.

The tool may comprise a downhole tool.

The tool may comprise a logging tool.

The apparatus for determining an acceleration of the line may comprise a sheave wheel of a known diameter.

The line may extend around a circumference of the sheave wheel.

The apparatus for determining an acceleration of the line may comprise a rotation sensor for measuring an angular acceleration of the sheave wheel.

The controller may comprise a system controller which is provided separately from the tool.

The system controller may be located remotely from the tool. For example, the system controller may be located at or adjacent to one end of the elongated space or remotely from the elongated space.

The system controller may be configured to receive the determined line acceleration from the apparatus for measuring the acceleration of the line.

The system controller may be configured to receive the measured angular acceleration of the sheave wheel.

The system controller may be configured to determine an acceleration of the line from the measured angular acceleration of the sheave wheel as sensed by the rotation sensor and the known diameter of the sheave wheel.

The system controller may be configured to receive the measured tool acceleration from the apparatus for measuring the acceleration of the tool via the line.

The system controller may be configured to receive an electrical signal representative of the measured tool acceleration from the apparatus for measuring the acceleration of the tool via the line.

The system controller may be configured to determine a required degree of damping according to the determined acceleration of the line and the measured acceleration of the tool.

The system controller may be configured to control the damper via the line so as to provide the required degree of damping of the movement of the tool along the elongated space.

The system controller may be configured to control the damper according to the determined acceleration of the line and the measured acceleration of the tool so as to vary a degree of the damping of the movement of the tool along the elongated space.

The controller may comprise a tool controller which is provided with the tool.

The tool controller may be configured to receive the determined line acceleration from the apparatus for determining the acceleration of the line via the line.

The tool controller may be configured to receive the measured tool acceleration from the apparatus for measuring the acceleration of the tool.

The tool controller may be configured to determine the required degree of damping according to the determined acceleration of the line and the measured acceleration of the tool.

The tool controller may be configured to control the damper so as to provide the required degree of damping of the movement of the tool along the elongated space.

The tool controller may be configured to control the damper according to the determined acceleration of the line and the measured acceleration of the tool so as to vary a degree of the damping of the movement of the tool along the elongated space.

The system may comprise a sensor element which is electrically connected to the system controller. The sensor element and the line may be configured for coupling of an electrical signal therebetween. For example, the sensor element and the line may be capacitively and/or inductively coupled for coupling of an electrical signal therebetween.

The tool may comprise a rolling body for rolling along a surface which defines the elongated space.

The damper may be configured to damp rolling of the rolling body so as to damp movement of the tool along the elongated space.

The tool may comprise a housing.

The rolling body may comprise a wheel configured for rotation relative to the housing.

The damper may be configured to damp rotation of the wheel relative to the housing to thereby damp movement of the tool along the elongated space.

The rolling body may define a generally cylindrical or a generally spherical outer surface for engaging the surface which defines the elongated space.

The tool may comprise a sprocket configured for rotation relative to the housing.

The rolling body may comprise an elongate member such as a track, a chain, a tape or a belt.

The rolling body may be in engagement with the sprocket.

The damper may be configured to damp rotation of the sprocket relative to the housing to thereby damp movement of the tool along the elongated space.

The tool may comprise a plurality of rolling bodies.

Each rolling body may comprise a wheel or an elongate member such as a track, a chain, a tape or a belt.

Each rolling body may be in engagement with a corresponding sprocket.

The damper may comprise a rotary damper.

The damper may comprise a variable damper which is capable of varying a degree of the damping.

The damper may comprise at least one of an electromagnetic damper, a viscoelastic damper, a hydraulic damper, an electro-hydraulic damper, an electro-rheological damper and a magneto-rheological damper.

The tool may comprise a gear box mechanically coupled between the rolling body and the damper. Such a gear box may allow a speed of rolling of the rolling body to be matched to an operational speed range of the damper. The gear box may have a fixed ratio or a variable ratio.

The tool may comprise a clutch mechanically coupled between the rolling body and the damper. The clutch may be used to selectively disengage and/or re-engage the rolling body and the damper. This may allow the rolling body and the damper to be disengaged for ease of deployment of the tool into the elongated space. This may allow the rolling body and the damper to be re-engaged for a logging run.

The rolling body may be biased for engagement with the surface which defines the elongated space.

The tool may comprise one or more flow control members which are configurable so as to control one or more viscous drag properties of the tool during movement of the tool through fluid present within the elongated space.

Each flow control member may comprise a flap which is pivotable relative to the housing so as to selectively extend the flap from the housing into the fluid present within the elongated space to thereby control the one or more viscous drag properties of the tool during movement of the tool through fluid present within the elongated space.

The tool may comprise a variable fluid flow orifice and a fluid flow path which extends through the orifice, wherein the orifice is variable so as to selectively control the one or more viscous drag properties of the tool during movement of the tool through fluid present within the elongated space.

The tool may comprise the apparatus for measuring an acceleration of the tool along the elongated space. For example, the tool may comprise a tool accelerometer for measuring an acceleration of the tool along the elongated space. The tool accelerometer may comprise a z-axis accelerometer.

The tool may comprise an attachment arrangement for mechanically and electrically attaching a line to the tool.

The tool may comprise a tension sensor for sensing a tension in the line at a position at or adjacent to the tool.

According to an aspect there is provided a tool for use in measuring a property of an environment or an object in, or adjacent to, an elongated space.

The elongated space may be defined downhole and/or wherein the elongated space is defined in, or adjacent to, an oil or gas well.

The tool may comprise a downhole tool.

The tool may comprise a logging tool.

The tool may comprise a sensor for measuring a property of an environment or an object in or adjacent to an elongated space.

The tool may comprise a damper for damping movement of the tool along the elongated space.

The tool may comprise a tool controller for controlling the damper.

The tool may comprise a rolling body for rolling along a surface which defines the elongated space.

The damper may be configured to damp rolling of the rolling body so as to damp movement of the tool along the elongated space.

The tool may comprise a housing.

The rolling body may comprise a wheel configured for rotation relative to the housing.

The damper may be configured to damp rotation of the wheel relative to the housing to thereby damp movement of the tool along the elongated space.

The rolling body may define a generally cylindrical or a generally spherical outer surface for engaging the surface which defines the elongated space.

The tool may comprise a sprocket configured for rotation relative to the housing.

The rolling body may comprise an elongate member such as a track, a chain, a tape or a belt.

The rolling body may be in engagement with the sprocket.

The damper may be configured to damp rotation of the sprocket relative to the housing to thereby damp movement of the tool along the elongated space.

The tool may comprise a plurality of rolling bodies.

Each rolling body may comprise a wheel or an elongate member such as a track, a chain, a tape or a belt.

Each rolling body may be in engagement with a corresponding sprocket.

The damper may comprise a rotary damper.

The damper may comprise a variable damper which is capable of varying a degree of the damping.

The damper may comprise at least one of an electromagnetic damper, a viscoelastic damper, a hydraulic damper, an electro-hydraulic damper, an electro-rheological damper and a magneto-rheological damper.

The tool may comprise a gear box mechanically coupled between the rolling body and the damper. Such a gear box may allow a speed of rolling of the rolling body to be matched to an operational speed range of the damper. The gear box may have a fixed ratio or a variable ratio.

The tool may comprise a clutch mechanically coupled between the rolling body and the damper. The clutch may be used to selectively disengage and/or re-engage the rolling body and the damper. This may allow the rolling body and the damper to be disengaged for ease of deployment of the tool into the elongated space. This may allow the rolling body and the damper to be re-engaged for a logging run.

The rolling body may be biased for engagement with the surface which defines the elongated space.

The tool may comprise one or more flow control members which are configurable so as to control one or more viscous drag properties of the tool during movement of the tool through fluid present within the elongated space.

Each flow control member may comprise a flap which is pivotable relative to the housing so as to selectively extend the flap from the housing into the fluid present within the elongated space to thereby control the one or more viscous drag properties of the tool during movement of the tool through fluid present within the elongated space.

The tool may comprise a variable fluid flow orifice and a fluid flow path which extends through the orifice, wherein the orifice is variable so as to selectively control the one or more viscous drag properties of the tool during movement of the tool through fluid present within the elongated space.

The tool may comprise the apparatus for measuring an acceleration of the tool along the elongated space. For example, the tool may comprise a tool accelerometer for measuring an acceleration of the tool along the elongated space. The tool accelerometer may comprise a z-axis accelerometer.

The tool may comprise an attachment arrangement for mechanically and electrically attaching a line to the tool.

The tool may comprise a tension sensor for sensing a tension in the line at a position at or adjacent to the tool.

The tool controller may be configured to receive a required degree of damping from a system controller, for example, via a line attached to the tool.

The tool controller may be configured to receive the required degree of damping from the system controller as an electrical signal received via the line.

The tool controller may be configured to receive a determined line acceleration from the system controller, for example, via a line attached to the tool.

The tool controller may be configured to receive the determined line acceleration from the system controller as an electrical signal received via the line.

The tool controller may be configured to determine a required degree of damping according to the received line acceleration and the acceleration as measured by the apparatus for measuring the acceleration of the tool.

The tool controller may be configured to control the damper so as to provide the required degree of damping of the movement of the tool along the elongated space.

BRIEF DESCRIPTION OF THE DRAWINGS

A method and a system for use in measuring a property of an environment or an object in, or adjacent to, an elongated space will now be described by way of non-limiting example only with reference to the following drawings of which.

DETAILED DESCRIPTION OF THE DRAWINGS

One skilled in the art will understand that the terms "uphole" and "downhole" are used herein for ease of illustration only, but are not intended to be limiting. The term "uphole" refers to a direction along a wellbore towards a point of entry of the wellbore into a surface such as the ground or the seabed, whilst the term "downhole" refers to a direction along the wellbore away from the point of entry. As such, when a wellbore is deviated from the vertical, such terms may refer to directions which differ significantly from a vertical direction and may even refer to horizontal directions. Similarly, the term "proximate" refers to a position closer to the point of entry of the wellbore into the surface, and the term "distal" refers to a position further away from the point of entry of the wellbore into the surface. Also, the term "raising" refers to movement of an object such as a tool within the wellbore towards the point of entry, whilst the term "lowering" refers to movement of an object such as tool within the wellbore away from the point of entry.

Figure 1:
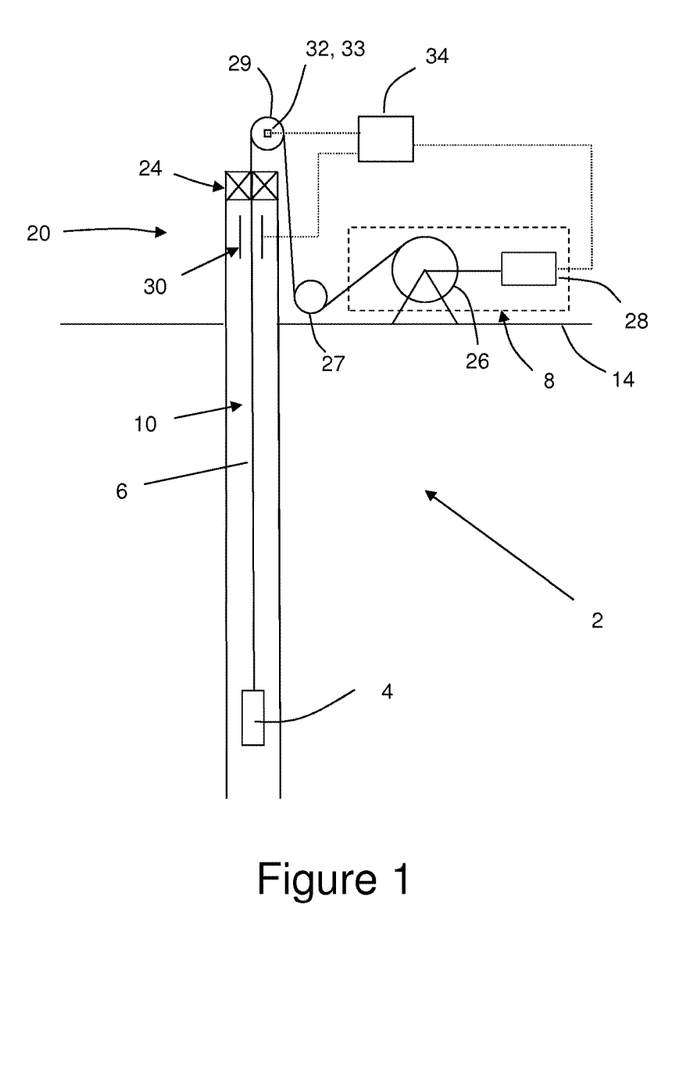
FIG. 1 schematically illustrates a system for use in measuring a property of an environment in or adjacent to a wellbore of an oil or gas well.

Referring initially to FIG. 1 there is shown a system generally designated 2 for use in measuring a property of an environment in, or adjacent, to a wellbore 10 of an oil or gas well. The system 2 includes a downhole logging tool generally designated 4, an insulated or composite slickline 6 from which the tool 4 is suspended, and a winch generally designated 8 for unspooling and/or spooling the slickline 6 to thereby lower and/or raise the tool 4 in the wellbore 10. The slickline 6 has a known stretch parameter. It should be understood that at least part of the wellbore 10 may be lined with a casing or the like and/or that the wellbore 10 may include one or more openhole sections.

As shown in FIG. 1, the winch 8 is located above the surface 14 in proximity to a wellhead arrangement 20 mounted at a head of the wellbore 10. It should be understood that the surface 14 may represent ground level or the seabed. It should also be understood that although the winch 8 is shown in FIG. 1 in proximity to the wellhead arrangement 20, the winch 8 may be located at or above the surface 14 remotely from the wellhead arrangement 20.

The wellhead arrangement 20 includes a stuffing box and lubricator arrangement 24 which permits movement of the slickline 6 in and out of the wellbore 10, whilst also sealing the wellbore 10 from an external environment above the surface 14. The winch 8 includes a drum 26 for the slickline 6 and a motor 28 for rotating the drum 26 in either direction.

The slickline 6 extends from the drum 26 of the winch 8 around a lower sheave wheel 27 and an upper sheave wheel 29 through the stuffing box and lubricator arrangement 24 to the tool 4. The upper sheave wheel 29 has a known diameter. The system 2 includes a rotation sensor 32 for counting the number of revolutions of the upper sheave wheel 29 and for measuring an angular acceleration of the upper sheave wheel 29. The system 2 further includes a strain sensor or load cell 33 for sensing a force exerted on a shaft of the upper sheave wheel 29 as a result of tension in the slickline 6.

The system 2 includes a tubular electrically conductive sensor element 30 mounted around the slickline 6 within the wellhead arrangement 20. Although not shown explicitly in FIG. 1, it should be understood that the slickline 6 includes an inner electrically conductive core surrounded by an outer electrically insulating layer such that, in use, electrical signals may be transmitted from the tool 4 to surface along the slickline 6. The sensor element 30 is located in sufficient proximity to the outer electrically insulating layer of the slickline 6 so that a bound electric field associated with an electrical signal travelling along an electrically conductive core of the slickline 6 extends and is coupled to the sensor element 30.

The system 2 further includes a system controller 34 which is provided separately from the tool 4 and which is configured for communication with the winch motor 28, the rotation sensor 32, the strain sensor 33, and the sensor element 30. The system controller 34 is configured to receive the number of revolutions of the upper sheave wheel 29 measured by the rotation sensor 32, the angular acceleration of the upper sheave wheel 29 measured by the rotation sensor 32, and the strain sensed by the strain sensor 33. In addition, as will be described in more detail below, the system controller 34 includes a transceiver (not shown) which is configured to communicate with a transceiver (not shown in FIG. 1) of the tool 4 using electrical signals transmitted via the sensor element 30 and the slickline 6.

Figure 2:
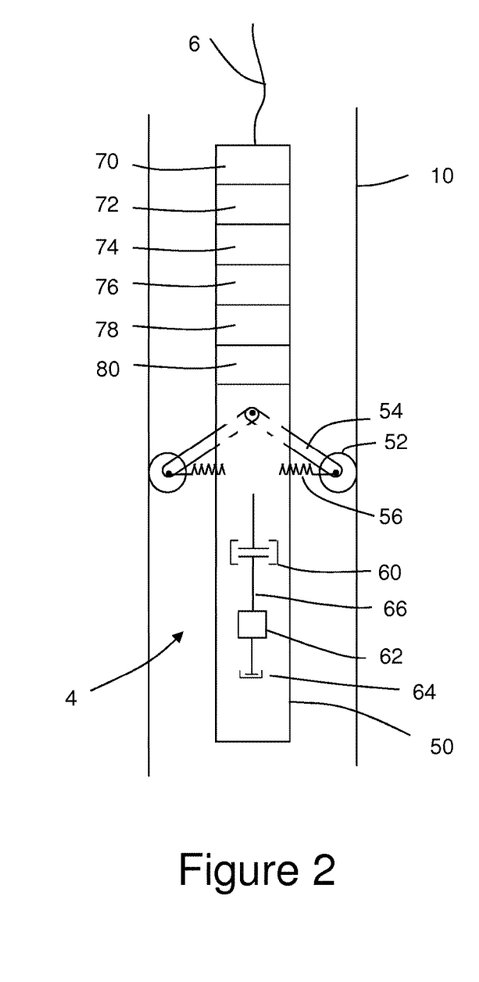
FIG. 2 schematically illustrates a downhole logging tool for use with the system of FIG. 1.

The tool 4 is shown in greater detail in FIG. 2 located within the wellbore 10. The tool 4 includes a tool housing 50 and a plurality of rolling bodies in the form of a plurality of wheels 52. Each wheel 52 is configured to roll along a surface of the wellbore 10 so as to assist the tool 4 to move relative to the wellbore 10. The tool 4 includes a plurality of wheel support members 54. A proximal end of each wheel support member 54 is pivotally attached to the housing 50. One of the wheels 52 is mounted for rotation at a distal end of each wheel support member 54. The tool 4 further includes a plurality of resilient members 56, each resilient member 56 extending between the housing 50 and a corresponding wheel support member 54 so as to resiliently bias the corresponding wheel support member 54 radially outwardly from the housing 50 for engagement of the corresponding wheel 52 with a surface of the wellbore 10.

The tool 4 includes a clutch 60, a gearbox 62 and a variable rotary damper 64 such as an electromagnetic rotary damper or a rotary dashpot. The rotary damper 64 is mechanically coupled via one or more shafts 66 and/or joints (not shown) to each wheel 52 via the gearbox 62 and the clutch 60 so that, in use, the rotary damper 64 damps rotation of each wheel 52. In use, the gearbox 62 serves to convert a rotational speed of the wheels 52 to a rotational speed which is compatible with an operational rotational speed range of the rotary damper 64. The gearbox 62 may provide a fixed gear ratio or a variable gear ratio. The clutch 60 may be used to engage and/or re-engage the mechanical drive between the wheels 52 and the gearbox 62.

The tool 4 further includes a rope socket 70 for mechanically and electrically connecting the housing 50 to the slickline 6, a z-axis accelerometer 72 for measuring axial acceleration of the tool 4, a tool transceiver 74 for transmitting electrical signals to the slickline 6 and receiving electrical signals from the slickline 6, a tool controller 76, a power source in the form of a battery 78, and a tool sensor arrangement 80 for measuring a property of an environment or an object located in or adjacent to the wellbore 10. The tool sensor arrangement 80 may, for example, comprise at least one of a temperature sensor, a pressure sensor, a gamma ray sensor, a magnetic field sensor, a Hall effect sensor, an acoustic sensor, and an optical sensor. The battery 78 is configured to provide electrical power to the variable rotary damper 64, the z-axis accelerometer 72, the tool transceiver 74, the tool controller 76 and the tool sensor arrangement 80. The tool controller 76 is configured for communication with the variable rotary damper 64, the z-axis accelerometer 72, the tool transceiver 74, the tool controller 76 and the tool sensor arrangement 80.

In use, prior to deployment of the tool 4 into the wellbore 10, the clutch 60 is used to disengage the mechanical drive between the wheels 52 and the gearbox 62 so as to permit "free-wheeling" operation of the wheels 52. To deploy the tool 4 to a desired logging start position, the winch 8 unspools slickline 6 so as to lower the tool 4 through the wellbore 10 under the action of gravity. As the tool 4 is lowered into the wellbore 10, the system controller 34 receives the measured number of revolutions of the sheave wheel 29 from the rotation sensor 32 and the strain measured by the strain sensor 33 and the system controller 34 determines the depth of the tool 4 from the measured number of revolutions of the sheave wheel 29, the known diameter of the sheave wheel 29, the strain measured by the strain sensor 33 and the known stretch parameter for the slickline 6.

Once the system controller 34 determines that the tool 4 has reached the desired logging start depth $D_{start}$ in the wellbore 10, the system controller 34 stops the winch 8 and communicates with the tool controller 76. The tool controller 34 activates the clutch 60 to re-engage the mechanical drive between the wheels 52 and the gearbox 62 prior to commencement of a logging run. In addition, the tool controller 34 communicates with the damper 64 so as to set a degree of damping applied by the damper 64 against rotation of the wheels 52 according to a desired predetermined winch speed which is to be used for the logging run. Setting the degree of damping in this way before commencement of the logging run, may reduce the time taken to suppress oscillations of the tool along the wellbore which may occur on commencement of rotation of the winch drum 26 and may, therefore, reduce the time taken to achieve a constant tool velocity after commencement of rotation of the winch drum 26 and thereby improve logging accuracy.

Figure 3:
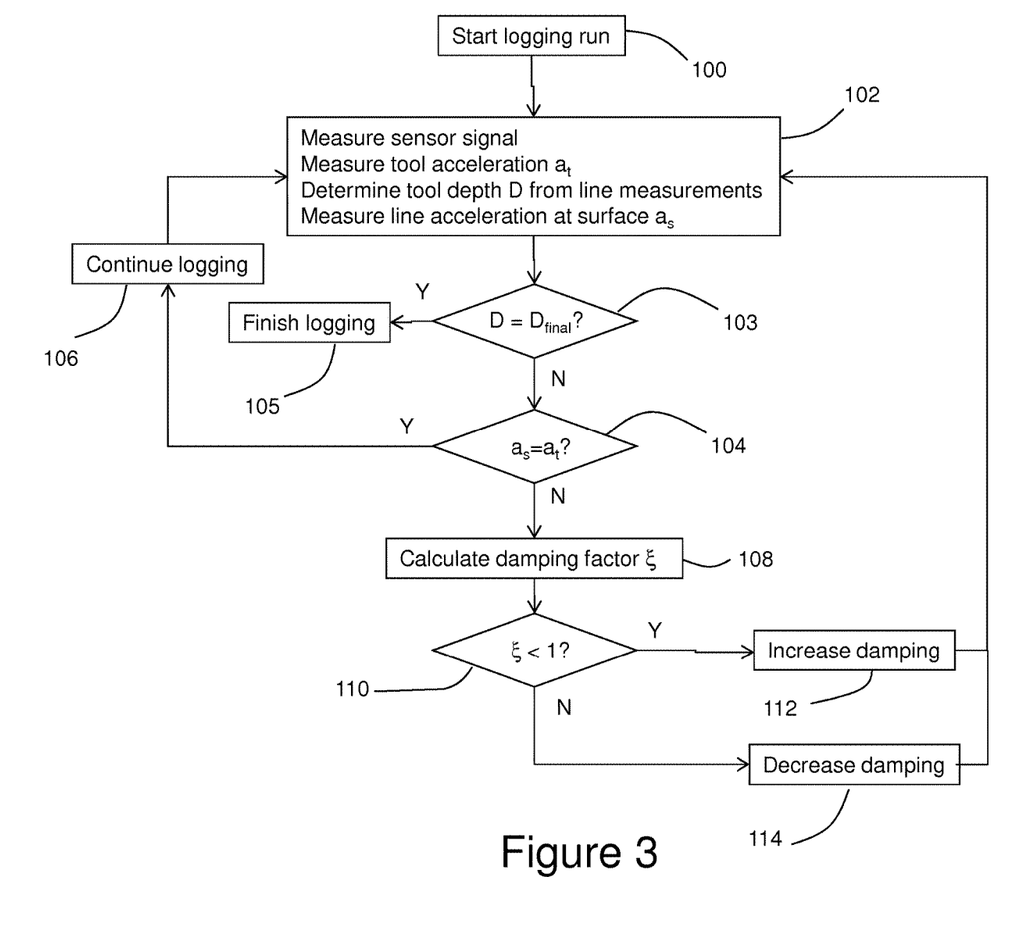
FIG. 3 shows a method of using the system of FIG. 1.

FIG. 3 illustrates the steps of a method for use in measuring a property of an environment in or adjacent to the wellbore 10. The method begins at step 100 with rotation of the winch drum 26 so as to spool the slickline 6. At step 102, the tool controller 76 measures a signal sensed by the tool sensor arrangement 80. The tool controller 76 stores the measured signal value in memory together with a corresponding measurement time value for analysis after the tool 4 has been recovered to surface. At step 102, the z-axis accelerometer 72 also measures the axial acceleration $a_t$ (direction and magnitude) of the tool 4 along the wellbore 10 and the tool transceiver 74 transmits the measured axial acceleration $a_t$ of the tool 4 to the system controller 34 as an electrical signal via the slickline 6 and the sensor element 30. At step 102, the system controller 34 also determines the depth D of the tool 4 from the measured number of revolutions of the sheave wheel 29, the known diameter of the sheave wheel 29, the strain measured by the strain sensor 33 and the known stretch parameter for the slickline 6. The system controller 34 stores each determined tool depth value together with a corresponding measurement time value for analysis after the tool 4 has been recovered to surface. At step 102, the system controller 34 also determines the acceleration $a_s$ (direction and magnitude) of the slickline 6 from the angular acceleration of the upper sheave wheel 29 and the known diameter of the sheave wheel 29. It should be understood that although at least some of the parameters measured at step 102 may be measured at the same instant in time, in general, at least some of the parameters measured at step 102 may be measured at different instants in time. In particular, the signal sensed by the tool sensor arrangement 80 may be measured at the same instant in time, or at a different instant in time, to the number of revolutions of the sheave wheel 29 and the strain measured by the strain sensor 33.

At step 103, the system controller 34 compares the determined tool depth D with a final tool depth $D_{final}$. If the tool 4 has reached the final tool depth $D_{final}$, the system controller 34 stops the winch 8 and logging finishes at step 105. If, however, the tool 4 has not reached the final tool depth $D_{final}$, the system controller 34 compares the determined slickline acceleration $a_s$ and the determined tool acceleration $a_t$ at step 104. If the difference between the slickline acceleration $a_s$ and the tool acceleration $a_t$ is less than a predetermined threshold value, logging continues as indicated at step 106 of FIG. 3. However, if the difference between the slickline acceleration $a_s$ and the tool acceleration $a_t$ is greater than or equal to the predetermined threshold value, the system controller 34 calculates a damping factor $\xi$ at step 108 from values of the tool acceleration $a_t$ measured over a predetermined time period T. The time period T is selected so as to be greater than or equal to a time period of oscillation of the tool 4 within the wellbore 10. At step 110, the system controller 34 compares the calculated damping factor $\xi$ with unity.

If the calculated damping factor $\xi$ is less than unity, the system controller 34 sends an electrical signal to the tool 4 via the sensor element 30 and the slickline 6. The electrical signal is received by the tool transceiver 74 and communicated to the tool controller 76. The tool controller 76 controls the damper 64 so as to increase the degree of damping applied by the damper 64 to each wheel 52 of the tool 4 at step 112 of FIG. 3.

If the calculated damping factor $\xi$ is greater or equal to unity, the system controller 34 sends an electrical signal to the tool 4 via the sensor element 30 and the slickline 6. The electrical signal is received by the tool transceiver 74 and communicated to the tool controller 76. The tool controller 76 controls the damper 64 so as to decrease the degree of damping applied by the damper 64 to each wheel 52 of the tool 4 at step 114 of FIG. 3.

Following adjustment of damping at step 112 or 114, logging continues with the repetition of step 102 and the subsequent steps as described above until the tool 4 reaches the final tool depth $D_{final}$.

Once the logging run is complete, the tool 4 is recovered to surface and the measured signal values and the corresponding signal measurement times are accessed from the memory of the tool controller 76. The tool depth values and the corresponding measurement times are also accessed from the system controller 34. The measured signal value is associated with a determined depth value at the same instant in time. If necessary, interpolation of the measured signal values as a function of time and/or interpolation of the determined depth values as a function of time is used to permit association of the measured signal value with the corresponding determined depth value at the same instant in time. In this regard, it should be understood that the tool controller 76 and the system controller 34 include synchronised clocks or timers to allow association of the measured signal value with the corresponding determined depth value at the same instant in time.

The method of FIG. 3 serves to minimise oscillations in the motion of the tool 4 within the wellbore 10 during a logging run. This may serve to maintain a relatively constant logging data density (sampled signal values per unit distance) when a constant sampling rate is used during a logging run and may improve the accuracy of the depth values associated with the sampled signal values. This is especially true where interpolation is used during subsequent processing of the measured signal values stored in the memory of the tool controller 76 and/or the determined depth values stored in the system controller 34.

Figure 4A:
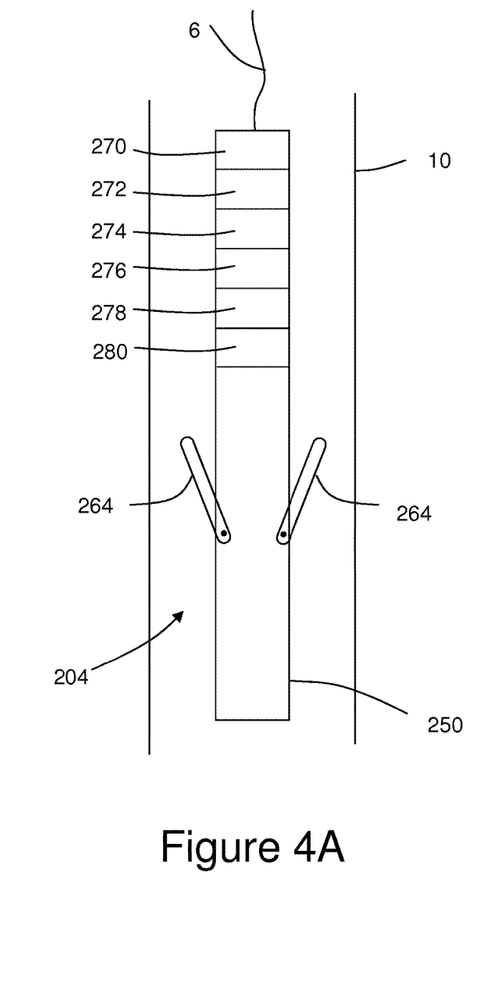
FIG. 4A schematically illustrates an alternative downhole logging tool for use with the system of FIG. 1.

FIG. 4A illustrates an alternative downhole logging tool generally designated 204 for use in the system 2 described with reference to FIG. 1 and for use in implementing the method described with reference to FIG. 3. The tool 204 shares many like features with the tool 4 described with reference to FIG. 2 and, as such, the features of the tool 204 shown in FIG. 4A share the same reference numerals as the corresponding features of the tool 4 shown in FIG. 2 incremented by "200". The tool 204 includes a housing 250, a rope socket 270 for mechanically and electrically connecting the housing 250 to the slickline 6, a z-axis accelerometer 272 for measuring axial acceleration of the tool 204, a tool transceiver 274 for transmitting electrical signals to the slickline 6 and receiving electrical signals from the slickline 6, a tool controller 276, a power source in the form of a battery 278, and a tool sensor arrangement 280 for measuring a property of an environment or an object located in or adjacent to the wellbore 10. The tool sensor arrangement 280 may, for example, comprise at least one of a temperature sensor, a pressure sensor, a gamma ray sensor, a magnetic field sensor, a Hall effect sensor, an acoustic sensor, and an optical sensor. The battery 278 is configured to provide electrical power to the variable damper 264, the z-axis accelerometer 272, the tool transceiver 274, the tool controller 276 and the tool sensor arrangement 280. The tool controller 276 is configured for communication with the variable damper 264, the z-axis accelerometer 272, the tool transceiver 274, the tool controller 276 and the tool sensor arrangement 280.

Unlike the tool 4 of FIG. 2, the tool 204 includes a plurality of flaps 264. Each flap 264, is pivotable relative to the housing 250 between an extended position shown in FIG. 4A and a retracted position (not shown) in which each flap 264 is located within a recess defined within an outer profile of the housing 250.

During deployment of the tool 204 into the wellbore 10, the flaps 264 are retained within the outer profile of the housing 250. This reduces the viscous drag acting on the housing 250 as the tool 204 is deployed into the wellbore 10 through a fluid present in the wellbore 10. Once the tool 204 has reached a desired start depth $D_{start}$ in the wellbore 10, the surface controller 34 communicates with the tool controller 276 via the slickline 6 and the tool controller 276 controls the degree of viscous drag acting on the housing 250 by controlling the pivot angle of the flaps 264 relative to the housing 250 as the tool 204 is moved along the wellbore 10 through the fluid present in the wellbore 10 according to the method described with reference to FIG. 3.

Figure 4B:
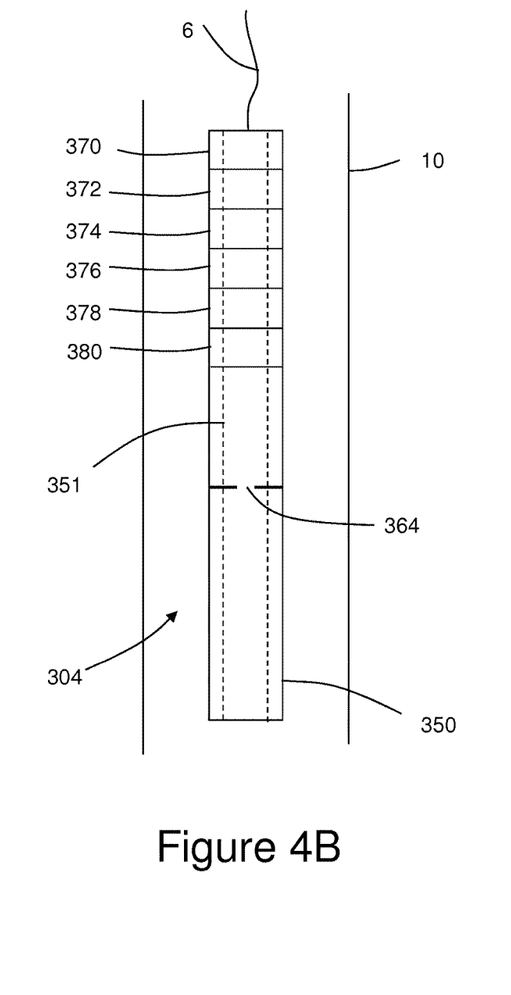
FIG. 4B schematically illustrates a further alternative downhole logging tool for use with the system of FIG. 1.

FIG. 4B illustrates a further alternative downhole logging tool generally designated 304 for use in the system 2 described with reference to FIG. 1 and for use in implementing the method described with reference to FIG. 3. The tool 304 shares many like features with the tool 204 described with reference to FIG. 4A and, as such, the features of the tool 304 shown in FIG. 4B share the same reference numerals as the corresponding features of the tool 204 shown in FIG. 4A incremented by "100". The tool 304 includes a generally tubular housing 350 which defines a fluid flow path 351 therethrough. The tool 304 further includes a variable fluid flow restriction or variable orifice 364.

During deployment of the tool 304 into the wellbore 10, the orifice 364 is configured in a fully open position. This reduces the viscous drag acting on the housing 350 as the tool 304 is deployed into the wellbore 10 through a fluid present in the wellbore 10. Once the tool 304 has reached a desired start depth $D_{start}$ in the wellbore 10, the surface controller 34 communicates with the tool controller 376 via the slickline 6 and the tool controller 376 controls the degree of viscous drag acting on the housing 350 by controlling the orifice 364 as the tool 304 is moved along the wellbore 10 through the fluid present in the wellbore 10 according to the method described with reference to FIG. 3.

One of ordinary skill in the art will appreciate that various modifications of the system, tool and method described above are possible. For example, rather than the tool controller 76 transmitting the measured tool acceleration $a_t$ to the system controller 34 via the slickline 6, using the system controller 34 to determine the required degree of damping and communicating the required degree of damping from the system controller 34 to the tool controller 76, the system controller 34 may transmit the determined slickline acceleration $a_s$ to the tool controller 76 and the tool controller 76 may determine the required degree of damping.

If the tool and surface transceivers and the sensor element 30 and slickline 6 permit, rather than storing sampled signal values in the memory the tool controller 76, the sampled signal values may be transmitted from the tool 4 to the system controller 34 via the slickline 6 and the sensor element 30 in real-time or near real-time.

The tool 4 may include a strain sensor for measuring tension in the slickline at or adjacent to the tool 4. The tension measured in the slickline 6 at or adjacent to the tool 4 may be used for controlling the speed at which the winch 8 spools and/or unspools the slickline 6.

The tool 4 may include a tractor drive arrangement for propelling the tool 4 along a non-vertical section such as a horizontal section of a deviated wellbore.

The method may comprise varying the degree of the damping before any known future change in line speed. The method may comprise varying the degree of the damping according to a known future change in line speed of the slickline 6. This may serve to at least partially reduce the time taken to reduce or suppress any oscillatory motion of the tool resulting from the known future change in line speed. This may help to reduce the time taken to achieve a constant tool speed and thereby improve logging accuracy.

The known future change in line speed may be a planned change in line speed which may, for example, be caused by a planned change in the speed of rotation of the winch drum 26. As described above, the planned change in line speed may comprise a change from zero line speed when the tool is stationary before a logging run to a desired or target line speed to be used for a logging run.

The known future change in line speed may be a predictable change in line speed which may, for example, be caused by a change in the spooled configuration of the slickline 6 on the winch drum 26 during rotation of the winch drum 26 at a constant speed.

The known future change in line speed may be caused during unspooling of the slickline 6 from the winch drum 26 rotating at a constant speed when the slickline 6 is unspooled from a first layer of slickline 6 on the winch drum 26 and is subsequently unspooled from a second layer of slickline 6 on the winch drum 26 which underlies the first layer of slickline 6. Unspooling of the slickline 6 from a different layer of slickline 6 on the winch drum 26 in this way may result in a change in the effective diameter of the winch drum 26 which results in a predictable change in line speed during rotation of the winch drum 26 at a constant speed.

Conversely, the known future change in line speed may be caused during spooling of the slickline 6 onto the winch drum 26 rotating at a constant speed when the slickline 6 is spooled so as to form a first layer of slickline 6 on the winch drum 26 and is subsequently spooled so as to form a second layer of slickline 6 on the winch drum 26 which overlies the first layer of slickline 6 on the winch drum 26. Spooling of the slickline 6 so as to form a different layer of slickline 6 on the winch drum 26 in this way may result in a change in the effective diameter of the winch drum 26 which results in a predictable change in line speed during rotation of the winch drum 26 at a constant speed.

The method may comprise determining a value for a position of the tool along the elongated space from the determined acceleration of the tool. The method may comprise determining a value for a position of the tool along the elongated space from the acceleration of the tool determined at one or more instants in time. The method may comprise determining, for example, measuring and/or sampling the acceleration of the tool at one or more instants in time after commencement of a logging run, for example after commencement of rotation of the winch drum 26.

The line may comprise a composite slickline, a wireline, an electric line, a reelable support member, a cable and the like.

The line may comprise one or more reinforcing elements embedded within a matrix material.

Each one or more reinforcing element may comprise a reinforcing fibre.

The matrix material may comprise a polymer material.

The line may comprise a fibre-polymer composite slickline.

The invention claimed is:

1. A method for use in measuring a property of an environment or an object in, or adjacent to, an elongated space, comprising:
   unspooling and/or spooling a line attached to a tool so as to move the tool along an elongated space;
   using the tool to measure a property of an environment or an object in, or adjacent to, the elongated space during movement of the tool along the elongated space;
   determining an acceleration of the line;
   measuring an acceleration of the tool along the elongated space; and
   controlling damping of the movement of the tool along the elongated space by controlling a damper provided with the tool according to the measured acceleration of the tool and the determined acceleration of the line.

2. A method according to claim 1, comprising:
   measuring an angular acceleration of a sheave wheel around which the line passes as the line is unspooled and/or spooled; and
   determining the acceleration of the line from the measured angular acceleration of the sheave wheel and a known diameter of the sheave wheel.

3. A method according to claim 1, comprising:
   determining a difference between the measured acceleration of the tool and the determined acceleration of the line; and
   varying the damping of the movement of the tool along the elongated space according to the difference between the measured acceleration of the tool and the determined acceleration of the line.

4. A method according to claim 3, comprising:
   varying the damping so as to reduce the difference between the measured acceleration of the tool and the determined acceleration of the line.

5. A method according to claim 3, comprising:
   varying the damping so as to reduce a magnitude of the difference between the measured acceleration of the tool and the determined acceleration of the line to a value which is less than a predetermined threshold value and/or to a value which is substantially equal to zero.

6. A method according to claim 1, comprising:
   varying the damping so as to critically damp any oscillatory motion of the tool along the elongated space.

7. A method according to claim 1, comprising:
   varying the damping before a known future change in line speed and/or varying the damping according to the known future change in line speed.

8. A method according to claim 1, comprising:
   determining a value for a position of the tool along the elongated space from the measured acceleration of the tool.

9. A method according to claim 1, comprising:
   using a system controller provided separately from the tool to determine the line acceleration;
   communicating the measured tool acceleration from a tool controller provided with the tool to the system controller via the line;
   using the system controller to determine a required degree of the damping according to the measured tool acceleration and the determined line acceleration;
   communicating the required degree of the damping from the system controller to the tool controller via the line; and
   using the tool controller to control the damper so as to vary the degree of the damping provided by the damper according to the required degree of the damping.

10. A method according to claim 1, comprising:
    using a system controller provided separately from the tool to determine the line acceleration;
    communicating the determined line acceleration to a tool controller provided with the tool via the line;
    communicating the measured tool acceleration to the tool controller;
    using the tool controller to determine a required degree of the damping according to the measured tool acceleration and the determined line acceleration; and
    using the tool controller to control the damper so as to vary the degree of the damping according to the determined required degree of the damping.

11. A method according to claim 1, comprising:
    determining a value for a position of the tool along the elongated space according to a determined length of line unspooled and/or spooled; and
    associating the measured value of the property of the environment or the object with the determined tool position value.

12. A method according to claim 11, comprising:
measuring a tension in the line; and
correcting the determined tool position value according to the measured line tension.

13. A method according to claim 1, comprising:
wherein the damper is configured to control damping of the movement of the tool along the elongated space by controlling damping of the rolling of a rolling body of the tool along a surface which defines the elongated space.

14. A method according to claim 13, wherein the rolling body comprises a wheel and the damper is configured to control damping of the rotation of the wheel so as to damp movement of the tool along the elongated space; or
wherein the rolling body comprises an elongate member, a track, a chain, a tape or a belt, wherein the rolling member is in engagement with a sprocket, and wherein the damper is configured to control damping of the rotation of the sprocket so as to damp movement of the tool along the elongated space.

15. A method according to claim 1, wherein the damper is configured to control one or more viscous drag properties of the tool during movement of the tool through fluid present within the elongated space so as to control damping of the movement of the tool along the elongated space and/or wherein the damper is configured to control the configuration of one or more flow control members of the tool so as to control the one or more viscous drag properties of the tool during movement of the tool through the fluid present within the elongated space.

16. A method according to claim 1, wherein the elongated space is defined downhole and/or wherein the elongated space is defined in, or adjacent to, an oil or gas well.

17. A system for use in measuring a property of an environment or an object in, or adjacent to, an elongated space comprises:
a tool having:
a sensor for measuring a property of an environment or an object in, or adjacent to, an elongated space; and
a damper for damping movement of the tool along the elongated space;
a line attached to the tool;
a winch for spooling and/or unspooling the line for movement of the tool along the elongated space;
an apparatus for determining an acceleration of the line;
an apparatus for measuring an acceleration of the tool along the elongated space; and
a controller configured to control the damper so as to control damping of the movement of the tool along the elongated space according to the acceleration of the line determined by the apparatus for determining the acceleration of the line and the acceleration of the tool measured by the apparatus for measuring the acceleration of the tool.

18. A system according to claim 17, wherein the tool comprises a rolling body for rolling along a surface which defines the elongated space, and wherein the damper is configured to damp rolling of the rolling body so as to damp movement of the tool along the elongated space.

19. A system according to claim 18, wherein the tool comprises a housing and the rolling body comprises a wheel configured for rotation relative to the housing, and the damper is configured to damp rotation of the wheel relative to the housing to thereby damp movement of the tool along the elongated space; or
wherein the tool comprises a housing and a sprocket configured for rotation relative to the housing, wherein the rolling body comprises an elongate member, a track, a chain, a tape or a belt, wherein the rolling body is in engagement with the sprocket, and wherein the damper is configured to damp rotation of the sprocket relative to the housing to thereby damp movement of the tool along the elongated space.

20. A system according to claim 18, wherein the damper comprises at least one of:
a rotary damper;
a variable damper which is capable of varying a degree of damping; and
at least one of an electromagnetic damper, a viscoelastic damper, a hydraulic damper, an electro-hydraulic damper, an electro-rheological damper and a magneto-rheological damper.

21. A system according to claim 18, wherein the tool comprises a gear box mechanically coupled between the rolling body and the damper and/or
the tool comprises a clutch mechanically coupled between the rolling body and the damper.

22. A system according to claim 17, wherein the damper comprises one or more flow control members which are configurable so as to control one or more viscous drag properties of the tool during movement of the tool through fluid present within the elongated space.

23. A system according to claim 22, wherein the tool comprises a housing, wherein each flow control member comprises a flap which is pivotable relative to the housing so as to selectively extend the flap from the housing into the fluid present within the elongated space and thereby control the one or more viscous drag properties of the tool during movement of the tool through fluid present within the elongated space.

24. A system according to claim 17, wherein the damper comprises a variable fluid flow orifice and a fluid flow path which extends through the orifice, wherein the orifice is variable so as to selectively control one or more viscous drag properties of the tool during movement of the tool through fluid present within the elongated space.

25. A system according to claim 17, wherein the tool comprises a downhole tool and/or a logging tool.

26. A system according to claim 17, wherein the elongated space is defined downhole and/or wherein the elongated space is defined in, or adjacent to, an oil or gas well.

* * * * *